United States Patent
Dasu et al.

(10) Patent No.: US 7,747,412 B1
(45) Date of Patent: Jun. 29, 2010

(54) MONITORING COMPLEX DATA FEEDS THROUGH ENSEMBLE TESTING

(75) Inventors: Tamraparni Dasu, New Vernon, NJ (US); Gregg Vesonder, Boonton Township, NJ (US); Jon R. Wright, Morris Plains, NJ (US)

(73) Assignee: AT&T Intellectual Property II, L.P., Bedminster, NJ (US)

( * ) Notice: Subject to any disclaimer, the term of this patent is extended or adjusted under 35 U.S.C. 154(b) by 120 days.

(21) Appl. No.: 11/275,395

(22) Filed: Dec. 29, 2005

(51) Int. Cl.
*G06F 17/18* (2006.01)
(52) U.S. Cl. .................................................. 702/179
(58) Field of Classification Search ............ 702/58, 702/69, 81, 90, 119, 120, 123, 177, 179, 702/181–185, 188; 455/67.3; 367/34; 714/26, 714/712
See application file for complete search history.

(56) References Cited

U.S. PATENT DOCUMENTS

| | | | | |
|---|---|---|---|---|
| 5,195,095 A | * | 3/1993 | Shah | 714/26 |
| 5,271,000 A | * | 12/1993 | Engbersen et al. | 370/244 |
| 5,481,548 A | * | 1/1996 | Wallace | 714/712 |
| 2004/0015793 A1 | * | 1/2004 | Saxena et al. | 716/4 |
| 2004/0058652 A1 | * | 3/2004 | McGregor et al. | 455/67.13 |
| 2005/0128872 A1 | * | 6/2005 | Valero et al. | 367/34 |

OTHER PUBLICATIONS

Preeti Singh, Trimmed mean, Jan. 28, 2003, Six Sigma, pp. 1-2.*
Hancong Liu et al., On-line oulier detection and data cleaning, Aug. 15, 2004, Computers & Chemical Engineering, vol. 28, pp. 1635-1647.*
T.G. Dietterich, "Ensemble Methods in Machine Learning", First International Workshop on Multiple Classifer Systems, pp. 1-15, Springer Verlag, 2000, Oregon State University, Corvallis, Oregon USA.
T. Dasu, G.T. Vesonder and J.R. Wright, "Data Quality Through Knowledge Engineering", ACM SIGKDD, pp. 705-710, 2003.
D. Kifer, S. Ben-David and J. Gehrke, "Detecting Change in Data Streams", Department of Computer Science, Cornell University, Proceedings of the 30th VLDB Conference, pp. 180-191, Toronto, Canada 2004.
L. Davis and U. Gather, "The Identification of Multiples Outliers", Journal of the American Statistical Association, vol. 88, No. 423, pp. 782-801, Sep. 1993.
R.L. Mason, C. Champ, N. Tracy, S. Wierda and J. Young, "Assessment of Multivariate Process Control Techniques", Journal of Quality Technology, vol. 29, No. 2, pp. 140-143, Apr. 1997.
A.J. Duncan, "Quality control and Industrial Statistics", 4th Edition, 1974.
P.J. Huber, "Robust Statistics", Wiley Series in Probability and Mathematical Statistics, 1981.
G.Box, G. Jenkis and G. Reinsel, "Time Series Analysis, Forecasting and Control", 3rd Edition, 1994.
C.R. Rao, "Linear Statistical Inference and Its Applications", 1965.

* cited by examiner

*Primary Examiner*—Mohamed Charioui
(74) *Attorney, Agent, or Firm*—Hope Baldauff Hartman, LLC

(57) ABSTRACT

Managing and monitoring multiple complex data feeds is a major challenge for data mining tasks in large corporations and scientific endeavors alike. The invention describes an effective method for flagging abnormalities in data feeds using an ensemble of statistical tests that may be used on complex data feeds. The tests in the ensemble are chosen such that the speed and ability to deliver real time decisions are not compromised.

20 Claims, 9 Drawing Sheets

3002

702

MONITORING COMPLEX DATA FEEDS THROUGH ENSEMBLE TESTING

FIELD OF THE INVENTION

The present invention relates to managing and monitoring multiple complex data feeds to discover abnormalities using an ensemble of statistical tests.

BACKGROUND OF THE INVENTION

As the ability to collect, transmit and store data grows, the challenges of managing, cleaning and mining this data grows. Typical data mining applications draw from multiple, interdependent feeds, originating from multiple and varied sources. Some applications log well over a terabyte of incoming data a month from hundreds of source feeds containing thousands of files. Most known solutions for managing data feeds rely on either ad hoc methods tailored to a particular application or address the problem superficially using limited functionality offered by commercial database systems or hastily marshaled in-house scripts.

Manual monitoring of feeds and tasks of this size is quite untenable as well as undesirable due to the potential for introducing human errors. Also, it is important to respond quickly as there is a short window during which feed files that have failed in transmission or otherwise may be retransmitted. Therefore, if an abnormality is noticed that is outside expectations, it needs to be flagged immediately for further investigation and remediation. For example, it may be known that a particular data feed should send a particular quantity of files at a particular time. If less than what is expected is received, a timely request may be made to retransmit the files to ensure that all files expected are received.

The use of statistical tests to monitor the quality of the data feeds is known in the art but current applications do not provide for use of a flexible and efficient method or system that can cover a wide variety of statistical distributions and anomalies. Current data mining applications use tests based on a single attribute (univariate) rather than multiple attributes and are only capable of flagging very particular types of abnormalities. These univariate tests may not provide the user with an abundance of confidence as individual tests may be limited in scope and application. Such known tests include Hampel bounds and trimmed means and the three-sigma limit types tests.

In addition, one current drawback to current data monitoring and mining applications is that users have found it difficult to visualize the results or indications of discovered abnormalities in the data feeds. A mechanism for displaying the results of various statistical tests to users who interpret such results would be beneficial.

Therefore, there is a need in the art for a method of managing and monitoring multiple complex data feeds in a computational light weight manner to discover abnormalities. The method should provide a user with an efficient way to alert users to the abnormalities so that a response can be rapidly deployed.

SUMMARY

Aspects of the present invention overcome problems and limitations of the prior art by providing a method for monitoring and managing data feeds using a statistical ensemble of tests. In an aspect of the invention, an ensemble of tests is chosen such that the speed and ability to deliver real time decisions are not compromised. Furthermore, the use of multiple tests allows for the detection of an assortment of potential anomalies and provides a user with confidence that the detection is valid as the detection is based on a multitude of statistical tests.

In an exemplary aspect of the invention, upper and lower error bounds are determined for an ensemble of tests. The upper and lower bounds may be based on historical data or expert knowledge. The ensemble of tests is applied to the data feeds for detection of abnormalities. The individual test comprising the ensemble of tests may be assigned weights based on validation from domain experts or historical data. The results of the monitoring may be displayed on a switchboard to users supervising the system.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings.

DETAILED DESCRIPTION

Exemplary Operating Environment

Figure 8:
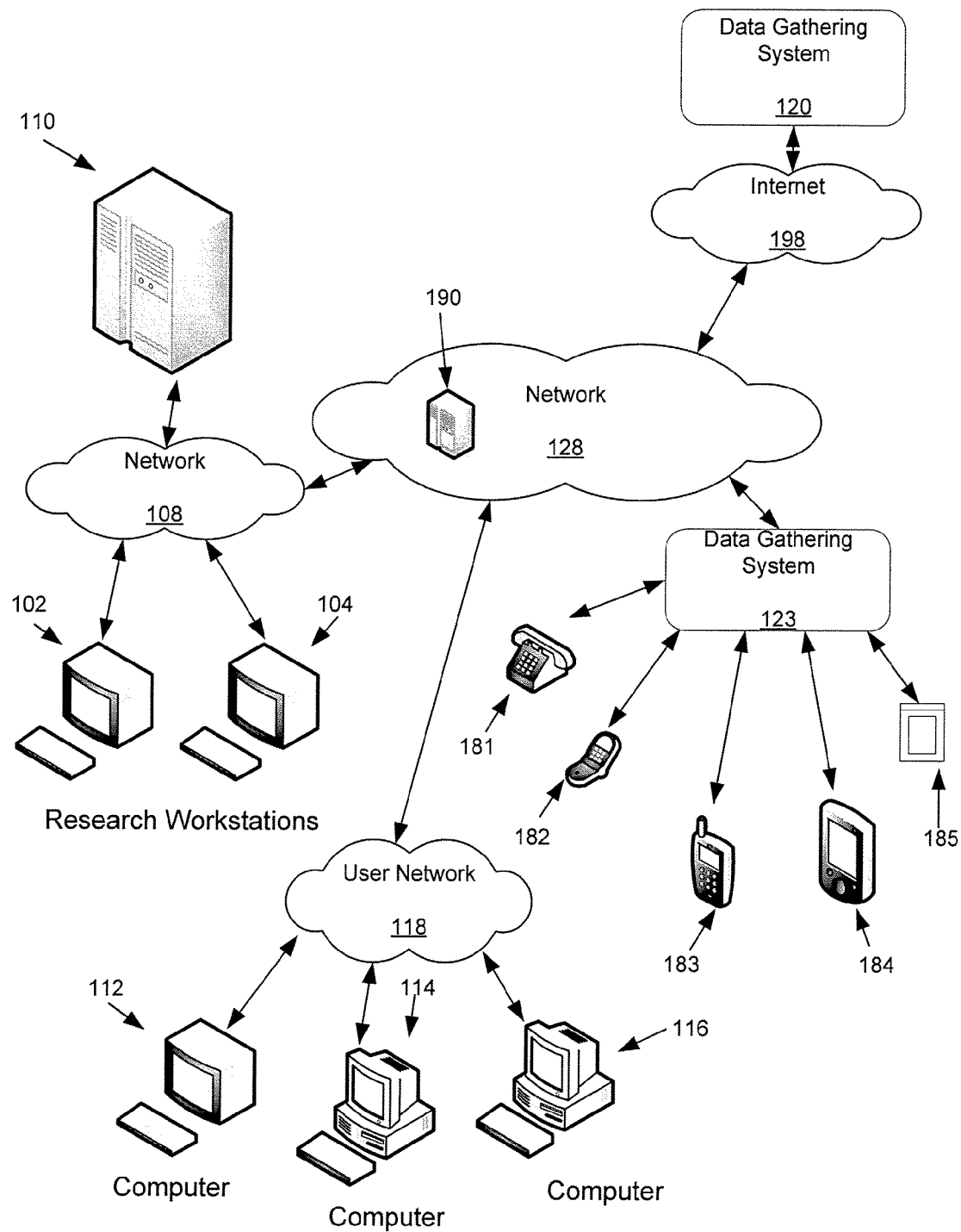
FIG. 8 shows a diagram of a system and network that may be used to implement aspects of the invention.

FIG. 8 shows a diagram of a computer system and network that may be used to implement aspects of the invention. A plurality of computers, such as workstations 102 and 104, may be coupled to a computer 112, via a network 108, 128, and 118. Computers 112, 114, and 116 may be coupled to a network 128 through network 118. Computers 112, 114, and 116 along with workstations 102 and 104 may provide multiple complex data feeds to network 128. Similarly, data gathering systems 120 and 123 may collect data and transmit that data directly or indirectly (via Internet 198) to network 128. The data gathering systems 120 and 123 may be connected to a host of various devices such as telephone 181, cellular phone 182, PDA 183, handheld device 184, and ATM device 185. Those skilled in the art will realize that other special purpose and/or general purpose computer devices may also be connected to the data gathering systems 120 and 123. Such devices may include credit card terminals, handheld devices, multiprocessor systems, microprocessor-based or programmable consumer electronics, networked PCs, minicomputers, mainframe computers, and the like.

One or more of the computer devices shown in FIG. 8 may include a variety of interface units and drives for reading and writing data or files. One skilled in the art will appreciate that networks 108, 118, and 128 are for illustration purposes and may be replaced with fewer or additional computer networks. One or more networks may be in the form of a local area network (LAN) that has one or more of the well-known LAN topologies and may use a variety of different protocols, such as Ethernet. One or more of the networks may be in the form of a wide area network (WAN), such as the Internet. Computer devices and other devices may be connected to one or more of the networks via twisted pair wires, coaxial cable, fiber optics, radio waves or other media.

The term "network" as used herein and depicted in the drawings should be broadly interpreted to include not only systems in which remote storage devices are coupled together via one or more communication paths, but also stand-alone devices that may be coupled, from time to time, to such systems that have storage capability. Consequently, the term "network" includes not only a "physical network" but also a "content network," which is comprised of the data—attributable to a single entity—which resides across all physical networks.

Network 128 may include monitoring hardware 190 to monitor the data feeds from the above numerous sources. The monitoring hardware 190 may include a processor, memory and other conventional computer components and may be programmed with computer-executable instructions to communicate with other computer devices.

Exemplary Embodiments

A method of determining outliers and abnormalities in complex data feeds through use of an ensemble of statistical tests is illustrated in the below described aspects of the invention. The number of statistical tests used in the ensemble of statistical tests may vary based upon the nature of the monitoring tasks. The invention provides a simple methodology for monitoring and analyzing complex, massive, multivariate data feeds. The technique is fast and effective. Additionally, the method may also utilize historical data and knowledge of experts to determine a weighting or ranking scheme for the selected tests.

In an aspect of the invention, bounds are determined to establish a baseline from which outliers and abnormalities may be determined. The bounds selected may be based upon the different tests used in the ensemble of tests. Based on the determined bounds, an alert may be generated when the data is determined to be a certain threshold from the baseline.

A method of computing an alert in accordance with an aspect of the invention may consist of testing a decision criterion in the form:

$$LB \leq (T(A(X)-C)/S \leq UB \quad \text{(Equation 1)}$$

where
LB represents a lower tolerance bound,
UB represents an upper tolerance bound,
T(X) is a statistic (estimate such as mean) computed from the data X,
C is a shift or offset to account for typical values of T(X) and S is a scaling factor to account for the spread in the values of the statistic T(X).

The above equation may represent baseline parameters of a particular test. Different definitions of the bounds, the shift and scale may give rise to different types of tests. These are non-parametric estimates so that the bounds may have a consistent meaning irrespective of the underlying probability distribution of data X.

The baseline parameters may be computed using either a gold standard data set or using historical data. In an alternative embodiment, the baseline parameters being used to calculate the bounds may be determined by experts using experience with the data being monitored. For illustrative purposes in the described examples, the baseline parameters for each test were calculated using three months of historical data. Those skilled in the art will realize that any time period of historical data may be used and that three months of historical data is only one illustrative example. In addition, a particular time period relevant to the data streams being monitored may also be selected. In addition, an appropriate time window may be based on domain knowledge of the particular data feeds. In the absence of such knowledge, recent historical data may be used to estimate the frequency of significant shifts in the distribution of the data.

In an exemplary embodiment of the invention, the baseline parameters may be computed for each of the 24 hours of the day using the three month historical data. That is, if $Y=Y(H)_i$, $i=1, \ldots, 90$ represents all the data collected during hour H of the day during the three months (for example, assuming there are 90 days in three months), then $LB(H)=LB(Y(H)_i, i=1, \ldots, 90)$
$UB(H)=UB(Y(H)_i, i=1, \ldots, 90)$
$C(H)=C(Y(H)_i, i\ 1, \ldots, 90)$
$S(H)=S(Y(H)_i, i=1, \ldots, 90)$ where $H=1, \ldots, 24$ represents the hours of the day. Weekdays may be treated separately from the weekends because the underlying domain exhibits different behavior in each of those cases.

To test a given hour $H_t$ for abnormalities, one may compute the test statistic T(X) using the data $X_1, X_2, \ldots, X_n$, that was accumulated in the test hour $H_t$ and compare it to the baseline parameters for the corresponding hour. An alert may be issued if the test statistic T(X) for the hour $H_t$ being tested fails to satisfy the decision criterion in Equation 1, where one uses baseline parameters from the lookup table for the corresponding hour $H_t$. In the remaining discussion and for ease of understanding, the $H_t$ notation has been dropped and as such the comparison between the test statistic T(X) and baseline parameters in the decision criterion for the below examples is always on an hourly basis, between the corresponding hours.

In an aspect of the invention, various tests may be selected based upon the nature of the monitoring task. For example, the goal may be to isolate outliers (unusual readings), building representative summaries, or creating data extracts to feed other applications such as visualization software. Based on these criteria, different combinations of tests may be selected.

The tests used may be simple nonparametric tests that use error bounds to identify outliers. A variety of tests ranging from those based on Hampel bounds and trimmed means, to the classical three-sigma limits for averages may be used. For example, the Hampel and trimmed mean bounds tests are robust to contamination and are not influenced by outliers. Robustness and breakdown point (the amount of data that can be corrupted without influencing the estimator) are important concepts in statistics that have been researched exhaustively to build robust estimators and tests. The three-sigma tests are familiar to those persons skilled in the art.

Choosing a suite of such tests helps to customize the ensemble to a desired level of sensitivity. The 3-sigma tests are sensitive to outliers and can be dramatically changed by a single aberrant observation. On the other hand, the tests based on Hampel and trimmed mean bounds are insensitive to significant changes so that they do not reflect underlying shifts in distributions that are relatively subtle, until a dramatic shift has occurred. The combination of such tests as described in the current description provides an improved array of abnormalities detection for the variety of processes that generate the data.

In addition, though most of the tests herein described are univariate, the concept of statistical ensembles can easily incorporate multivariate tests like Hotelling's $T^2$ for detecting differences as well as temporal models [1] if needed. (For additional prior art resources regarding detecting difference see; R. L. Mason, C. Champ, N. Tracy, S. Wierda, and J. Young. Assessment of multivariate process control techniques. Journal of Quality Technology, 29:140-143, 1997. For additional prior art information on temporal models see; G. Box, G. M. Jenkins, and G. Reinsel, Time Series Analysis: Forecasting & Control. Prentice Hall, 1994.)

Furthermore, one may incorporate recent tests for change detection in multi-dimensional data feeds for more dynamic data. (For additional prior art information see; D. Kifer, S. Ben-David, and J. Gehrke. Detecting change in data streams. In VLDB Conference, 2004.)

In an aspect of the invention, the Hampel identifier test may be used as one of the statistical tests. The Hampel test is a nonparametric test that is based on robust estimates of the center and scale, the Median and the Median Absolute Deviation and its asymptotic behavior. Robustness implies stability with respect to extreme outliers that may occur. (For additional prior art information see; P. J. Huber. Robust Statistics. Wiley, New York, 1981.)

Therefore, the Hampel test offers protection against flagging alerts precipitously based on a few extreme observations. As an example, the baseline parameters for the Hampel test may include:
  LB=−3, UB=3,
  C=Median
  S=1.4826*(Median of |T(X)—C|).

In the above example, T(X) is the median of the data gathered during that particular hour being tested, and LB, UB, C, and S are the baseline parameters computed from the three month historical data for that corresponding hour. The constant S ensures unbiasedness for certain types of distributions. (For additional prior art information on constant S see; L. Davies and U. Gather. The identification of multiples outliers. Journal of the American Statistical Association, 88:782-801, 1993.)

In another aspect of the invention, the quantiles test may be used as one of the statistical tests. The quantiles test is an ordering test which allows a way of automatically flagging really small and really large data points. The quantiles test may be valuable if one wants to screen the very top portion of the data or a particular area of the data such as the top five percent of the largest files. In the quantiles test, one may compute the highest X percentile and the lowest Y percentile based on the historical data corresponding to the hour of the day that we are testing. The baseline parameters may be for example:
  LB=$5^{th}$ percentile, UB=$95^{th}$ percentile
  C=0
  S=1.0

Those skilled in the art will realize that the upper and lower bound do not need to be symmetric.

In another aspect of the invention, tests may be based on the classical Central Limit Theorem and the sampling distribution of the sample mean. For example, such test may include 5% trimmed mean, 5% trimmed mean log, 3-sigma and 3-sigma log tests. (For additional prior art information on these tests see; C. R. Rao. Linear Statistical Inference and Its Applications. Wiley, New York, 1973.)

In these test we note that the mean T(X) of all data gathered during an hour, has a normal distribution with parameters that can be computed from the three month historical data for the corresponding hour of day.

The phrase trimmed mean refers to the fact that one may "trim" a certain portion of the data by dropping it from the computations. Those skilled in the art will realize that it is acceptable to trim up to 10% to 20% of the data, ensuring that the bounds (baseline parameters) are not influenced by the occasional aberrant observation. (For additional prior art information see; P. J. Huber. Robust Statistics. Wiley, New York, 1981.)

The baseline parameters may be for example:
  LB=−3* K(H), UB=3* K(H)
  C=Mean
  S=Standard Error The Standard Error is the standard deviation scaled by the number of data points $X_i$ (sample size) in the hour for which we are conducting the test. (For additional prior information see; C. R. Rao. Linear Statistical Inference and Its Applications. Wiley, New York, 1973.)

The Mean and the standard deviation may be calculated from the historical data. An internal scaling constant K(H) may be used that adds a slight twist on the conventional control charts. This constant may depend on the hour of the day and is meaningful only for this application and adds an extra piece of information to the chart that may assist users. Because the same constant is applied to the test statistic T(X) the alert outcome and its interpretation remain unaltered. (For additional prior art information about classical control charts where K(H)=1 see; A. J. Duncan. Quality Control and Industrial Statistics. Irwin, Homewood, 1974.)

In another aspect of the invention, various weights may be assigned to the selected tests. The weights may be assigned by ranking them in the order of agreement either with empirical evidence from historical data of alerts or in the order of agreement with knowledge experts who label the alerts as genuine or false. Those skilled in the art will realize that other means of ranking are possible and applicable. As a default, equal weights may be assigned to each of the tests. In another aspect of the invention, various weights may be applied to the historical data. For example, more weight may be given to recent historical data and less weight to older historical data.

In another aspect of the invention, the tests may be updated periodically due to changes in the processes that generate the data such as increased traffic, new network elements that are added resulting in increased feed volumes and frequency. As a consequence, the statistical distributions of the data feed characteristics change as well. In an embodiment, the baseline parameters used in equation 1 are updated when statistically significant changes are detected in the data feeds. In addition, feedback from the system may be used to validate both the ensemble of tests as well as the opinions of the experts. If a system is unaffected by or recovers rapidly with no fallout from alerts that are consistently tagged as "authentic" then the tests as well as the experts have to be re-evaluated.

Figure 7:
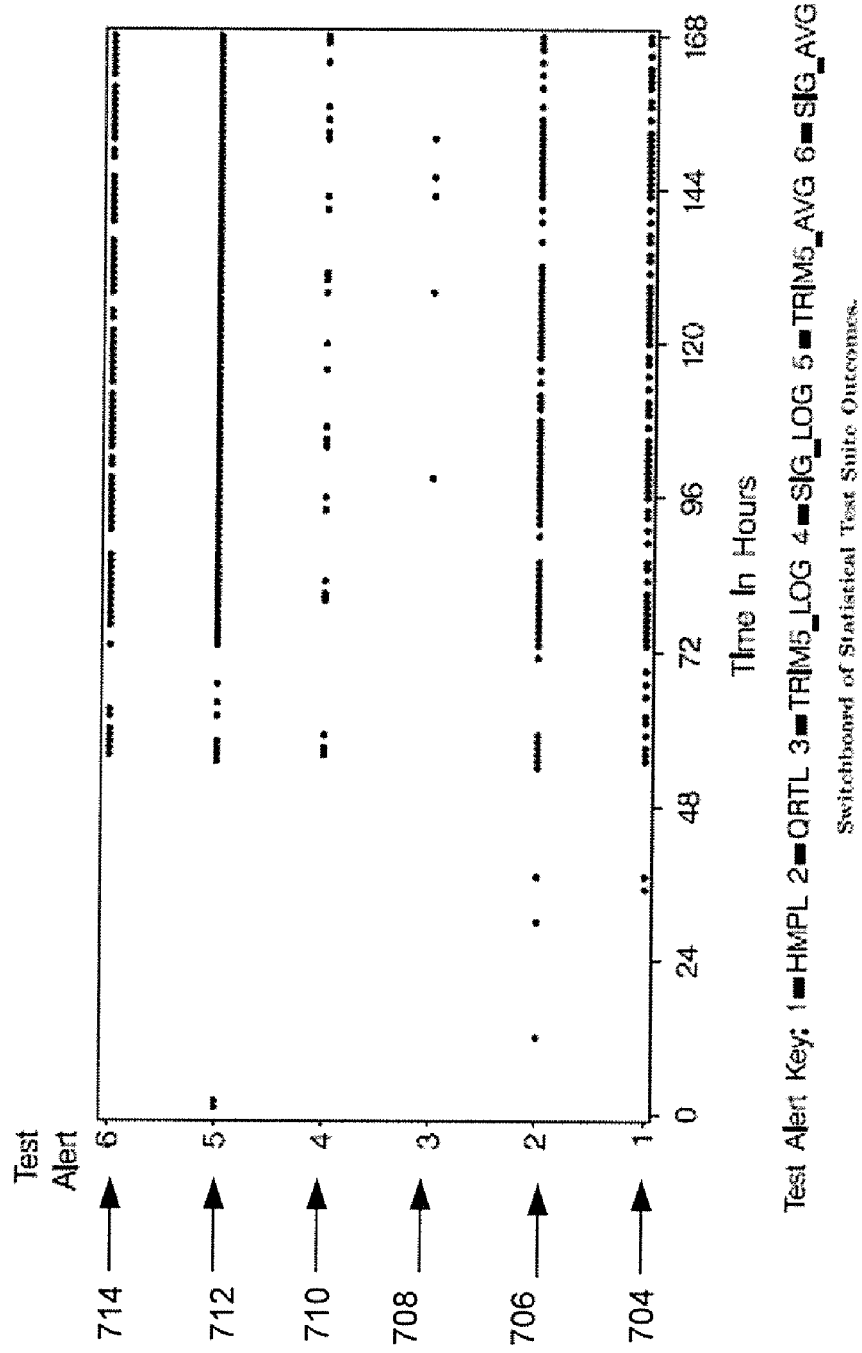
FIG. 7 illustrates a switchboard for displaying the ensemble test results in accordance with an aspect of the invention.

FIG. 7 illustrates an exemplary switchboard 702 which shows the results of an ensemble comprising six tests. FIG. 7 is exemplary of a monitoring application where multiple feeds are received and sent to a computational cluster where they are cleaned, combined, prepared for various data mining tasks and ultimately archived. It is important in such a monitoring application to ensure that all the required feed files have arrived uncorrupted in a timely fashion.

The following example is an illustrative example of the invention and is not intended to limit the scope of the present invention. FIG. 7 displays the results of the ensemble of tests of the monitoring system to ensure the smooth flow of data, processes, data mining algorithms and results.

It is noted that log files play an important role in monitoring data feed activities and health. The log files contain data about when, where and which files were received and which processes and machines touched these files. In addition, the system may maintain a variety of metadata about the contents and the nature of the feed files. The metadata as well as the data in the files themselves may be monitored, repaired and analyzed.

Data contained in the log files may be aggregated into hourly data summaries that describe various aspects e.g., number of files that arrive during that hour, total of the file sizes for that hour, number of errors e.g., mangled headers or mismatched checksums and so on. As an example, the "file size" attribute may be used to illustrate the ensemble. The following discussion only discuses a single attribute to simplify the example. Those skilled in the art will realize that multiple attributes may be used and that multivariate tests may also be used.

The hourly totals may be grouped by hour of the day and are used to compute the baseline parameters to build nonparametric tests based on quantiles and means. Using nonparametric tests ensures that the tests are widely applicable, as opposed to tests based on restrictive models based on distributional assumptions.

Furthermore, in the current example the data is grouped by hour of day due to strong daily cyclical patterns. The results of the alerts are displayed on visual "switchboard" 702 that is easy to read and understand. The switchboard lights up whenever a test flags an out of bound reading. The more lights that turn on, the greater our confidence that the alert is genuine and warrants immediate attention. Furthermore, weights may be assigned to the tests based on empirical validation or agreement with experts.

FIGS. 1-6 show the results of using an ensemble of six tests for monitoring the exemplary data feeds based on Hampel bounds, quantiles (95% and 5% bounds), trimmed mean bounds and three sigma bounds tests applied to average file size and average of log transformed file size data. Those skilled in the art will realize that more sophisticated tests based on multiple attributes, or tests that capture temporal patterns or detect changes in data streams may be used. Other variants to include in the ensemble are obtained by changing the window of historical data from three months or by varying the weights (more weight to recent data, less as we go farther back in time).

Figure 1:
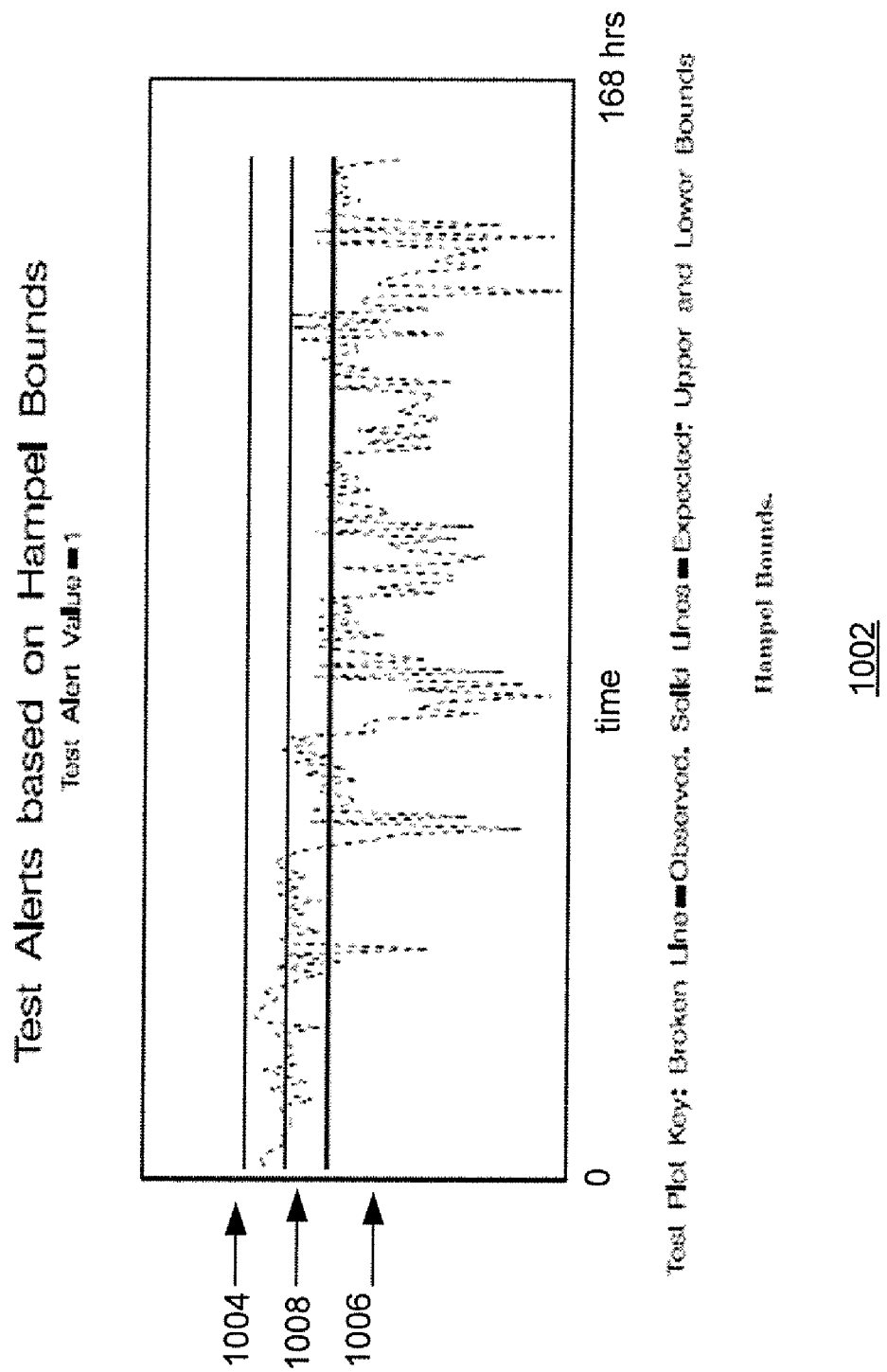
FIG. 1 illustrates a Hampel bounds test for use in an ensemble of monitoring tests that may be used in accordance with an aspect of the invention.

FIG. 1 shows the hourly readings for a one-week period (hours 1 to 168) based on the Hampel bounds test 1002. FIG. 1 indicates when the data is below or above the baseline parameters. Because the bounds are constant, the chart resembles process control charts which are easy to read. As mentioned above, the Hampel identifier test is robust test that is not unduly affected by one single bad observation in the three-month history used to compute the Hampel bounds 1002. In FIG. 1, the upper bounds 1004, the lower bounds 1006, and the expected values 1008 are indicted by solid lines. As shown in FIG. 1, the total file sizes are well behaved initially but go below the lower bounds 1006, then return briefly to within bounds and then rapidly go below the lower bounds 1006 again. Clearly the data indicates a problem. It may be seen in FIG. 7 that whenever the Hampel test indicates an outlier a dot is plotted at the corresponding time period on the switchboard in FIG. 7 with a test alert value=1 (704).

Figure 2:
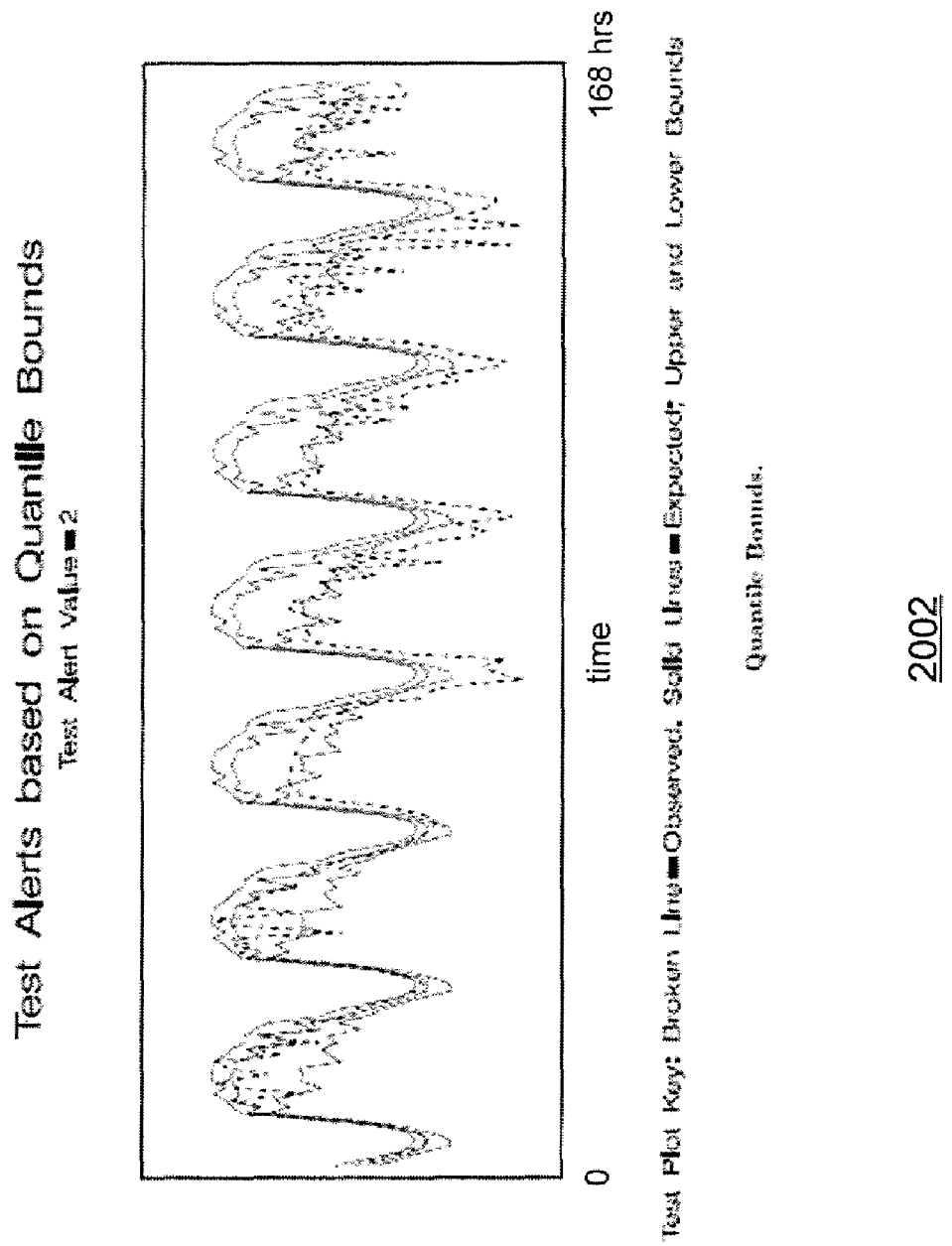
FIG. 2 illustrates a quantiles test for use in the ensemble of monitoring tests that may be used in accordance with an aspect of the invention.

FIG. 2 shows the upper and lower bounds based on the $5^{th}$ and $95^{th}$ quantiles respectively for use in the quantiles test 2002. The quantiles test 2002 is useful when we know a priori that we want to examine such as the 10% of our most extreme data, irrespective of whether it is within acceptable limits or not. For instance, one might want to monitor the biggest and smallest files for duplication and completeness respectively. Similarly, in other contexts, one might want to monitor the network elements that handle the least and most traffic at any given point in time.

The upper and lower bound do not have to be symmetric bounds. For example, the $1^{st}$ and $97^{th}$ percentiles may be selected, if one knows that the distribution is skewed. Whenever the quantiles test flags outliers, a dot is plotted at the corresponding time period with a test alert value=2 (706) on the switchboard in FIG. 7.

Figure 3:
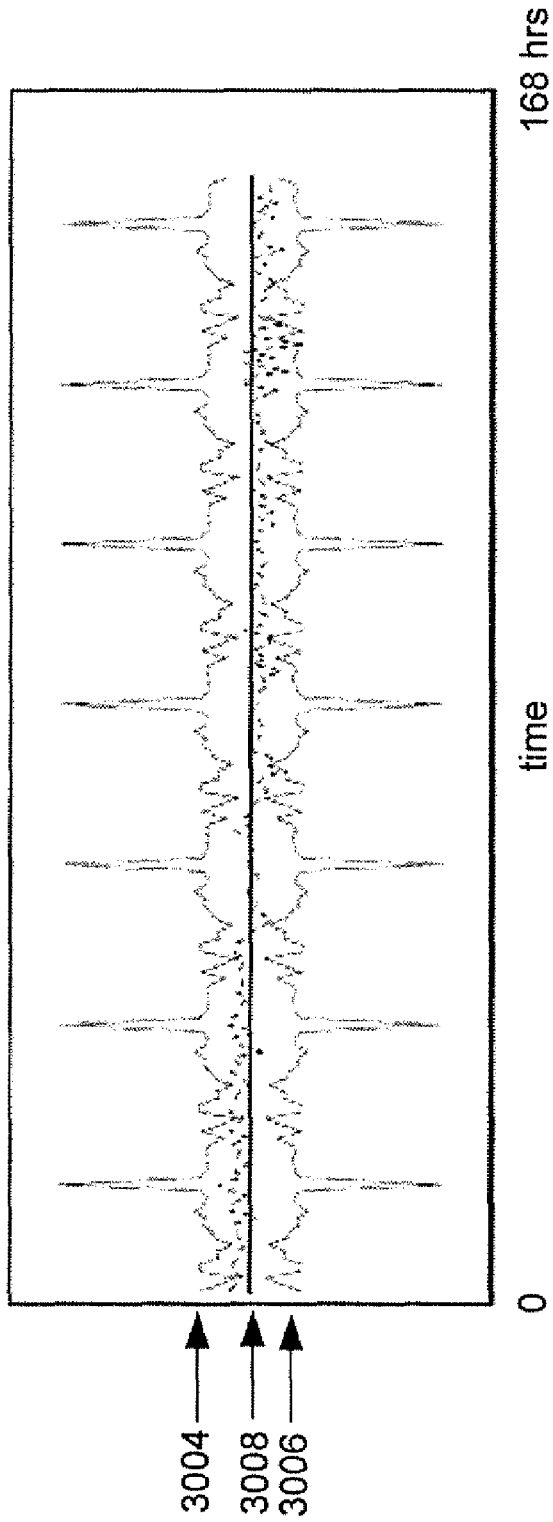
FIG. 3 illustrates a 5% trimmed mean bounds test for use in an ensemble of monitoring tests that may be used in accordance with an aspect of the invention.
Figure 4:
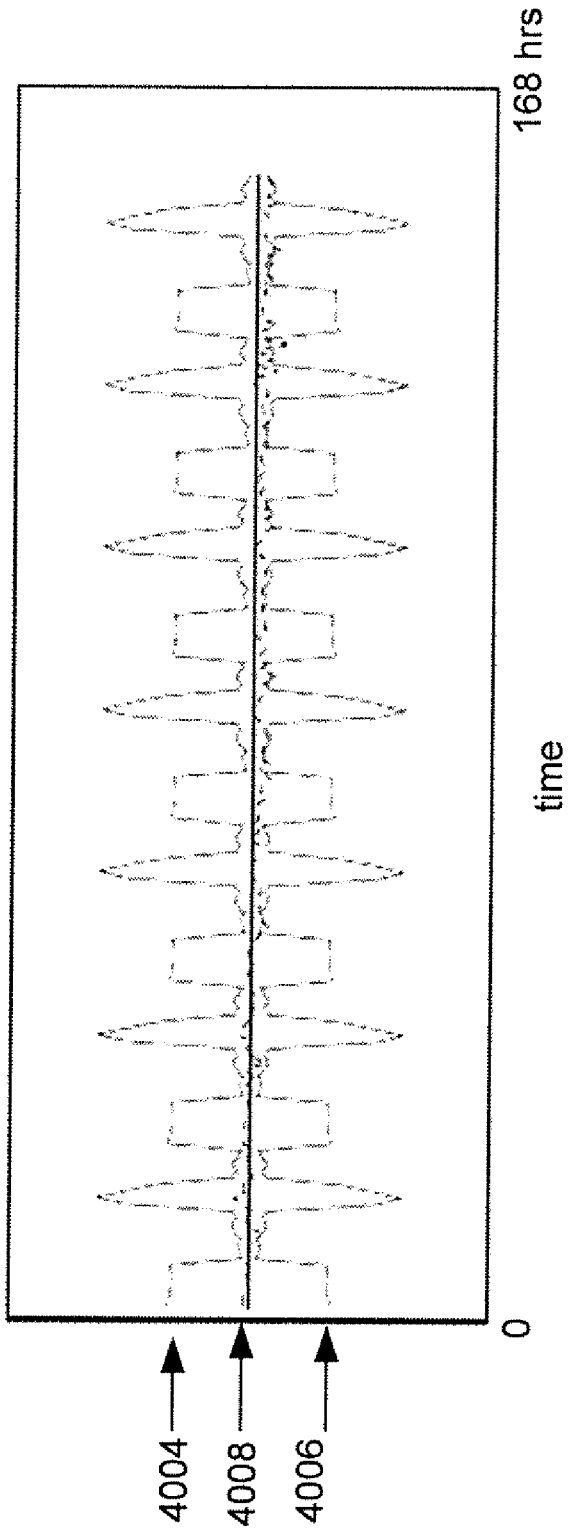
FIG. 4 illustrates a three sigma bounds test for use in an ensemble of monitoring tests that may be used in accordance with an aspect of the invention.

FIG. 3 and FIG. 4 are based on a log-transform of the data. In particular, FIG. 3 is based on 5% trimmed mean bounds (3002) and FIG. 4 is based on a three sigma bounds (4002). In FIG. 3, the upper bounds 3004, the lower bounds 3006, and the expected values 3008 are indicted by solid lines. Similarly, in FIG. 4, the upper bounds 4004, the lower bounds 4006, and the expected values 4008 are indicted by solid lines. These tests may be effective when a user wants to flag outliers measured in magnitudes rather than simple standard deviations. The transformation is convenient for long tailed distributions like the log-normal. However, because we have an ensemble to capture a wide set of scenarios; we do not need to anticipate the distribution of the data. Whenever the 5% trimmed mean log test flags outliers, a dot is plotted at the corresponding time period with a test alert value=3 (708) on the switchboard in FIG. 7. Similarly, whenever the 3 sigma log test flags outliers, a dot is plotted at the corresponding time period with a test alert value=4 (708) on the switchboard in FIG. 7.

Figure 5:
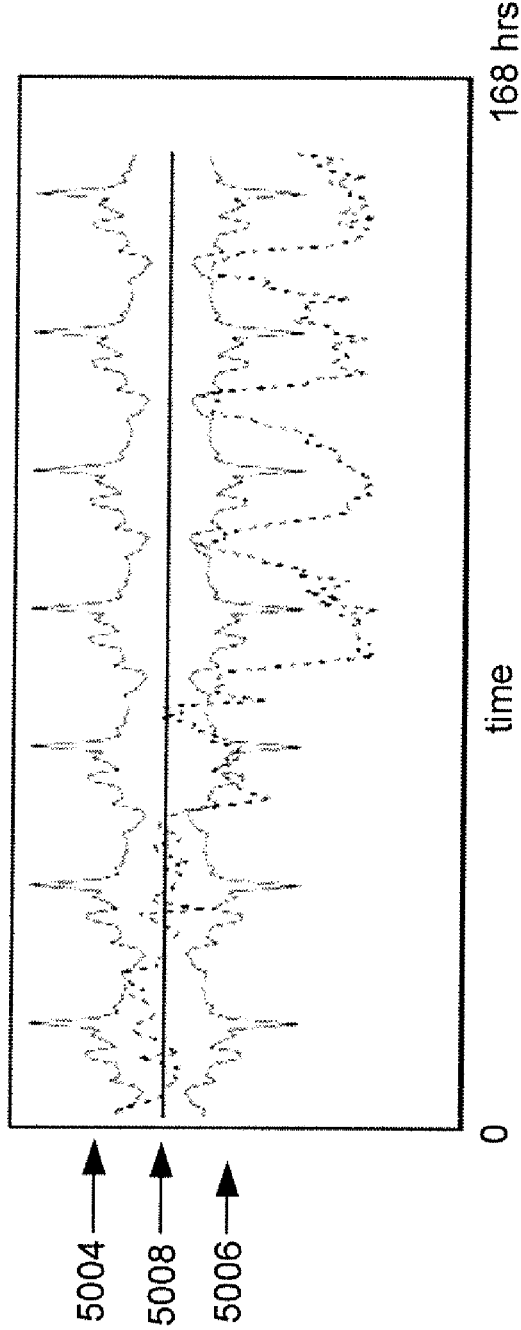
FIG. 5 illustrates a trimmed average test for use in an ensemble of monitoring tests that may be used in accordance with an aspect of the invention.
Figure 6:
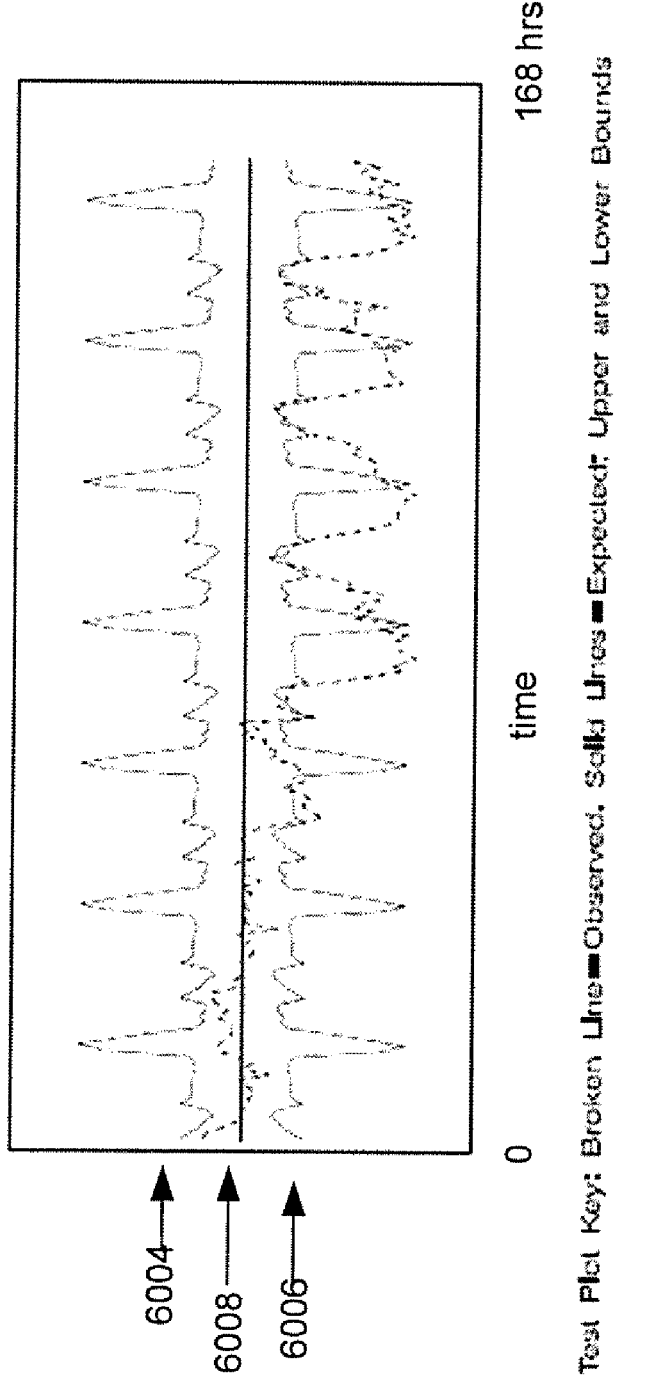
FIG. 6 illustrates a 3 sigma average test for use in an ensemble of monitoring tests that may be used in accordance with an aspect of the invention.

Finally, the last two exemplary tests shown in FIGS. 5 and 6 are the bounds computed from a trimmed average (FIG. 5, 5002) and 3 sigma average (FIG. 6, 6002) of the untransformed data. In FIG. 5, the upper bounds 5004, the lower bounds 5006, and the expected values 5008 are indicated by solid lines. Similarly, in FIG. 6, the upper bounds 6004, the lower bounds 6006, and the expected values 6008 are indicted by solid lines. Whenever the 5% trimmed mean test flags outliers, a dot is plotted at the corresponding time period with a test alert value=5 (712) on the switchboard in FIG. 7. Similarly, whenever the 3 sigma test flags outliers, a dot is plotted at the corresponding time period with a test alert value=6 (714) on the switchboard in FIG. 7.

As discussed above, FIG. 7 shows the switchboard with dots corresponding to various test alerts. Those skilled in the art will realize that switchboard 702 may take visual forms other than the shown graph and cover various time periods of interest to the user. In FIG. 7, the switchboard 702 is relatively peaceful and blank towards the early part of the week, with no dots to indicate alerts that the feed is out of control. It is clear that during the later part of the week, there is a persistent problem with the feed as indicated by all the tests lighting up. In addition, FIG. 7 also indicated that some of the exemplary tests used in the example may be more sensitive than others. For example, in FIG. 7, the Hampel (Test Alert Value=1) and the Quantile test (Test Alert Value=2) are both set off. It is interesting that the Hampel test flags alerts, indicating that there is a strong wholesale movement in the data. This is appropriate as one can see from the data. However, for obvious reasons, the tests based on the log transforms (Test Alert Values=3 (trimmed) and Test Alert Value=4 (mean)) are more conservative. These tests are useful when one is looking for shifts in orders of magnitudes rather than a simple standard deviation away. Finally, the 3-Sigma charts based on the 5% trimmed mean (Test Alert Value=5) and mean (Test Alert Value=6) are closely tied to the data and light up quite frequently. Again, the fact that the trimmed mean test flags alerts indicates that the shift in the data is quite significant.

Figure 9:
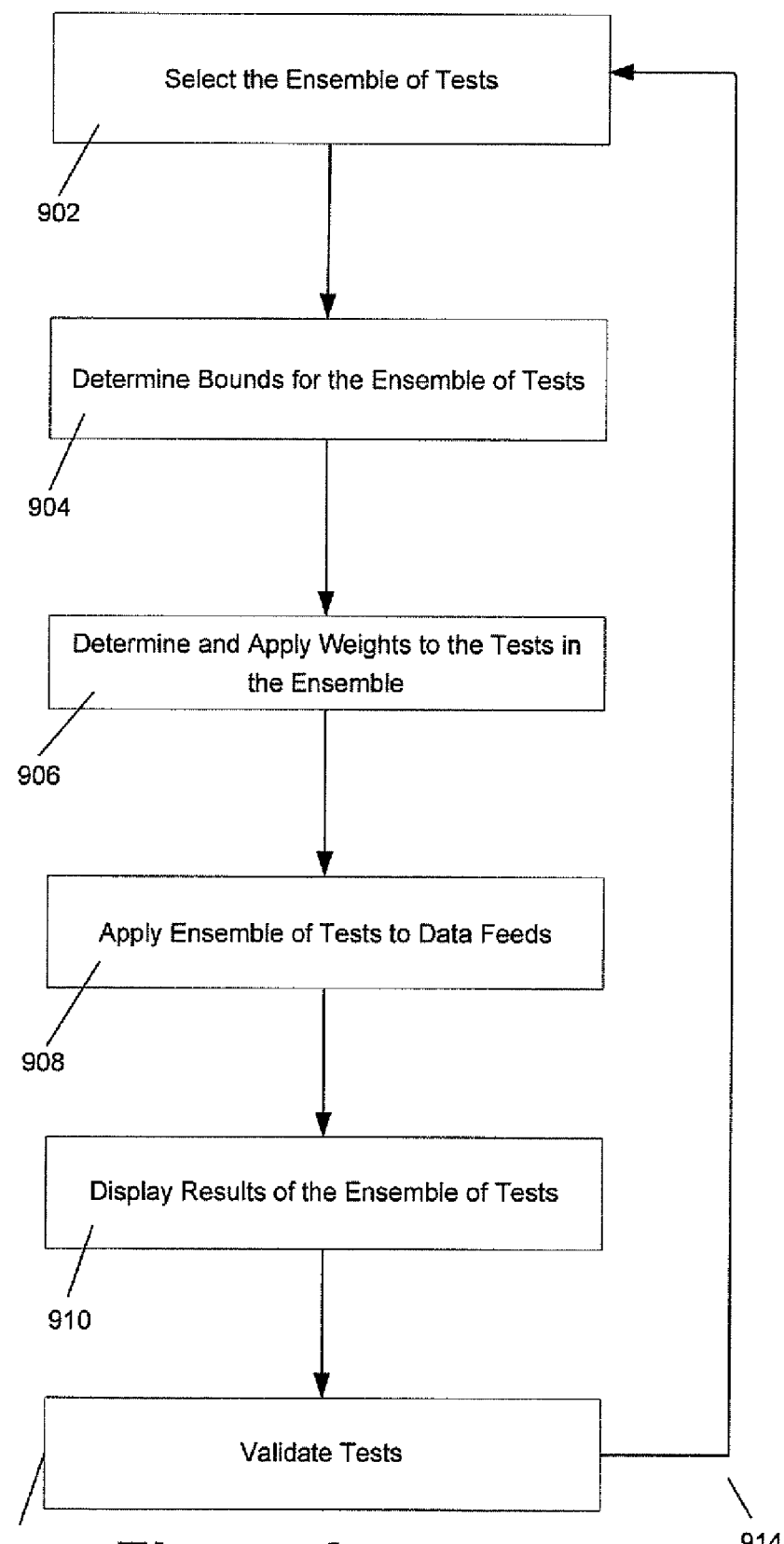
FIG. 9 illustrates a flow diagram for monitoring multiple data feeds for abnormalities in accordance with an aspect of the invention.

FIG. 9 illustrates a flow diagram for monitoring multiple data feeds for abnormalities in accordance with an aspect of the invention. In FIG. 9 at step 902, at least two statistical tests are selected that will be used in the ensemble of tests. The statistical tests may be chosen based on the nature of the monitoring task. For example, the monitoring task may be to monitor data feed from various call centers that are received at a central location. The feeds may include call records for various calls completed by customers. The call records may be forwarded to the central location for creation of accurate billing statements. In an alternative scenario, the at least two statistical tests may be selected to monitor credit card transactions that are being forwarded from numerous locations to a central location for creation of billing statements. Those skilled in the art will realize that the nature of the monitoring task will assist in the proper selection of the multitude of statistical tests to be used in the ensemble of tests.

In step 904, the bounds for the ensemble of tests may be determined. The bound may be determined based on equation 1 disclosed above. Next, in step 906 each of the selected tests in the ensemble of tests may be weighted. The selection of the weight may be determined based on historical data or expert experience. In step 908, the ensemble of tests is applied to the various data feed to monitor for abnormalities.

Next, in step 910, the results of the applied ensemble of tests may be displayed. The display may take the form of a switchboard as shown in FIG. 7. In step 912 the tests used in the ensemble of tests may be periodically validated. The validation may be used to provide feedback (step 914) to a user in the selection of tests in step 902.

While the invention has been described with respect to specific examples including presently preferred modes of carrying out the invention, those skilled in the art will appreciate that there are numerous variations and permutations of the above described systems and techniques that fall within the spirit and scope of the invention.

We claim:

1. A system comprising:
   one or more processors; and
   one or more memories storing computer-executable instructions, that, when executed by the one or more processors, cause the one or more processors to perform:
   selecting at least two statistical tests to form an ensemble of statistical tests, the at least two statistical tests including a five percent trimmed mean test;
   applying the ensemble of statistical tests to multiple data feeds;
   displaying results of the at least two statistical tests to determine abnormalities;
   generating an alert when the multiple data feeds are determined to be a threshold from a baseline; and
   evaluating the ensemble of statistical tests based upon the generating.

2. The system of claim 1, wherein the at least two statistical tests are weighted.

3. The system of claim 2, wherein the weight of each of the at least two statistical tests is determined by historical data.

4. The system of claim 1, the one or more memories further including instructions for:
   determining bounds for each of the at least two statistical tests.

5. The system of claim 1, wherein the selection of the at least two statistical tests includes selection of a Hampel identifier test.

6. The system of claim 1, wherein the selection of the at least two statistical tests includes selection of a quantiles test.

7. The system of claim 1, wherein the selection of the at least two statistical tests includes selection of a 3-sigma log test.

8. The system of claim 1, wherein the selection of the at least two statistical tests includes selection of a 3-sigma test.

9. A computer-readable medium having computer-executable instructions that, when executed by a computer, cause the computer to perform:
   selecting at least two statistical tests to form an ensemble of statistical tests, the at least two statistical tests including a five percent trimmed mean test;
   determining bounds for the ensemble of statistical tests;
   applying the ensemble of statistical tests to the multiple data feeds;
   displaying results of the at least two statistical tests to determine abnormalities;
   generating an alert when the multiple data feeds are determined to be a threshold from a baseline; and
   evaluating the ensemble of statistical tests based upon the generating.

10. The computer-readable medium of claim 9, wherein the selection of the at least two statistical tests includes a Hampel identifier test.

11. The computer-readable medium of claim 9, wherein the selection of the at least two statistical tests includes a quantiles test.

12. The computer-readable medium of claim 9, wherein the selection of the at least two statistical tests includes a 3-sigma log test.

13. The computer-readable medium of claim 9, wherein the selection of the at least two statistical tests includes a 3-sigma test.

14. A system comprising:
   one or more processors; and
   one or more memories storing computer-executable instructions, that, when executed by the one or more processors, cause the one or more processors to perform:
   selecting at least three statistical tests to form an ensemble of statistical tests, the at least three statistical tests including a five percent trimmed mean test;
   determining bounds for each of the at least three statistical tests;
   applying the ensemble of statistical tests to multiple data feeds;
   displaying results of the at least three statistical tests to determine abnormalities;
   generating an alert when the multiple data feeds are determined to be a threshold from a baseline; and
   evaluating the ensemble of statistical tests based upon the generating.

15. The system of claim 14, wherein the at least three statistical tests are weighted.

16. The system of claim 15, wherein the weight of each of the at least three statistical tests is determined by historical data.

17. A system comprising:

one or more processors; and one or more memories storing computer-executable instructions, that, when executed by the one or more processors, cause the one or more processors to perform:

selecting at least two statistical tests to form an ensemble of statistical tests, the at least two statistical tests including a five percent trimmed mean log test;

applying the ensemble of statistical tests to multiple data feeds;

displaying results of the at least two statistical tests to determine abnormalities;

generating an alert when the multiple data feeds are determined to be a threshold from a baseline; and evaluating the ensemble of statistical tests based upon the generating.

18. The system of claim 17, wherein the selection of the at least two statistical tests includes a 3-sigma log test.

19. A computer-readable medium having computer-executable instructions that, when executed by a computer, cause the computer to perform:

selecting at least two statistical tests to form an ensemble of statistical tests, the at least two statistical tests including a five percent trimmed mean log test;

determining bounds for the ensemble of statistical tests;

applying the ensemble of statistical tests to the multiple data feeds;

displaying results of the at least two statistical tests to determine abnormalities;

generating an alert when the multiple data feeds are determined to be a threshold from a baseline; and evaluating the ensemble of statistical tests based upon the generating.

20. The computer-readable medium of claim 19, wherein the selection of the at least two statistical tests includes a 3-sigma log test.

\* \* \* \* \*